March 24, 1942.  L. G. EVERHART ET AL  2,277,394
WIRE TYING DEVICE FOR HAY BALERS
Filed Feb. 25, 1941   8 Sheets-Sheet 1
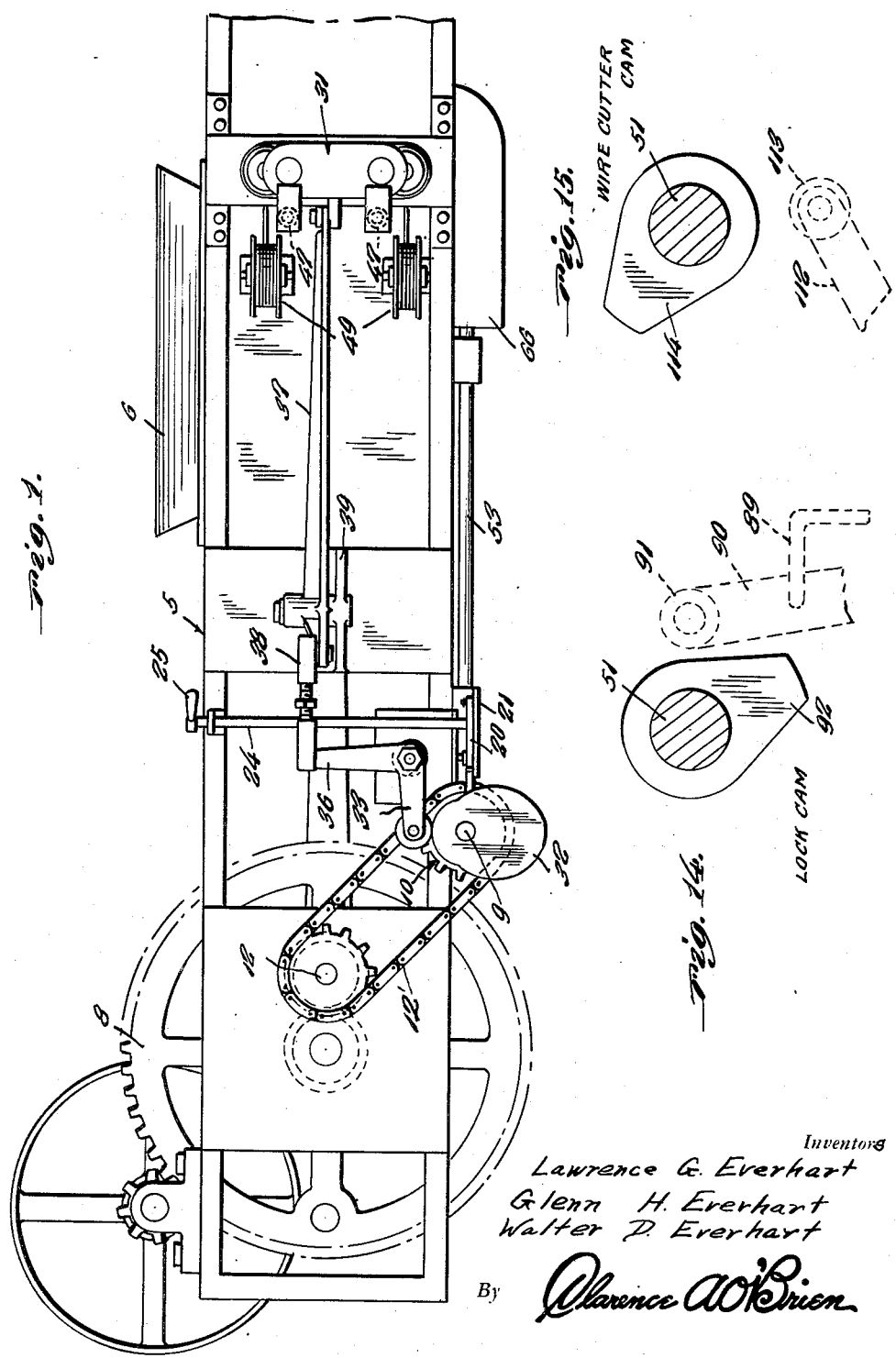
Inventors
Lawrence G. Everhart
Glenn H. Everhart
Walter D. Everhart
By Clarence A. O'Brien
Attorney

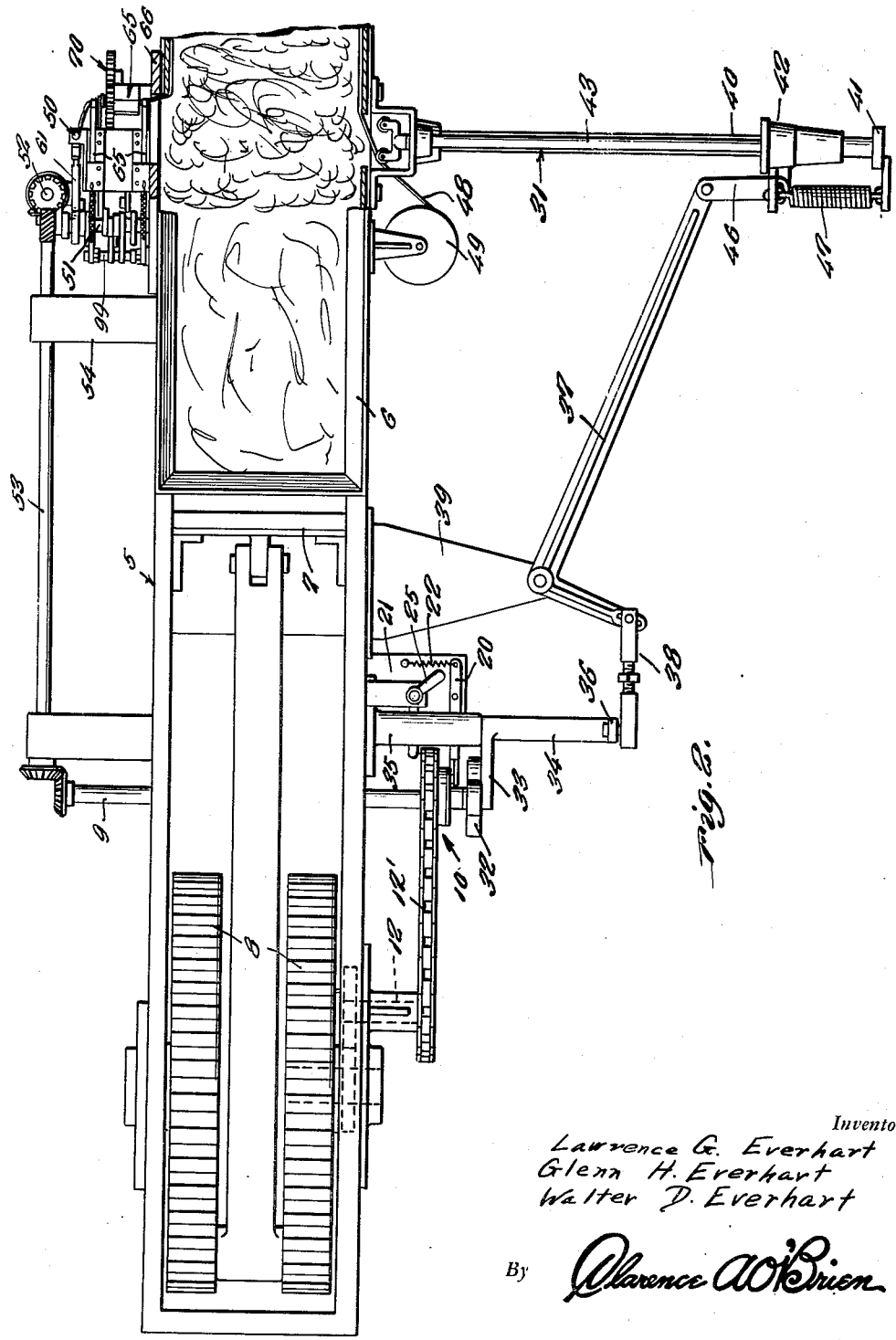

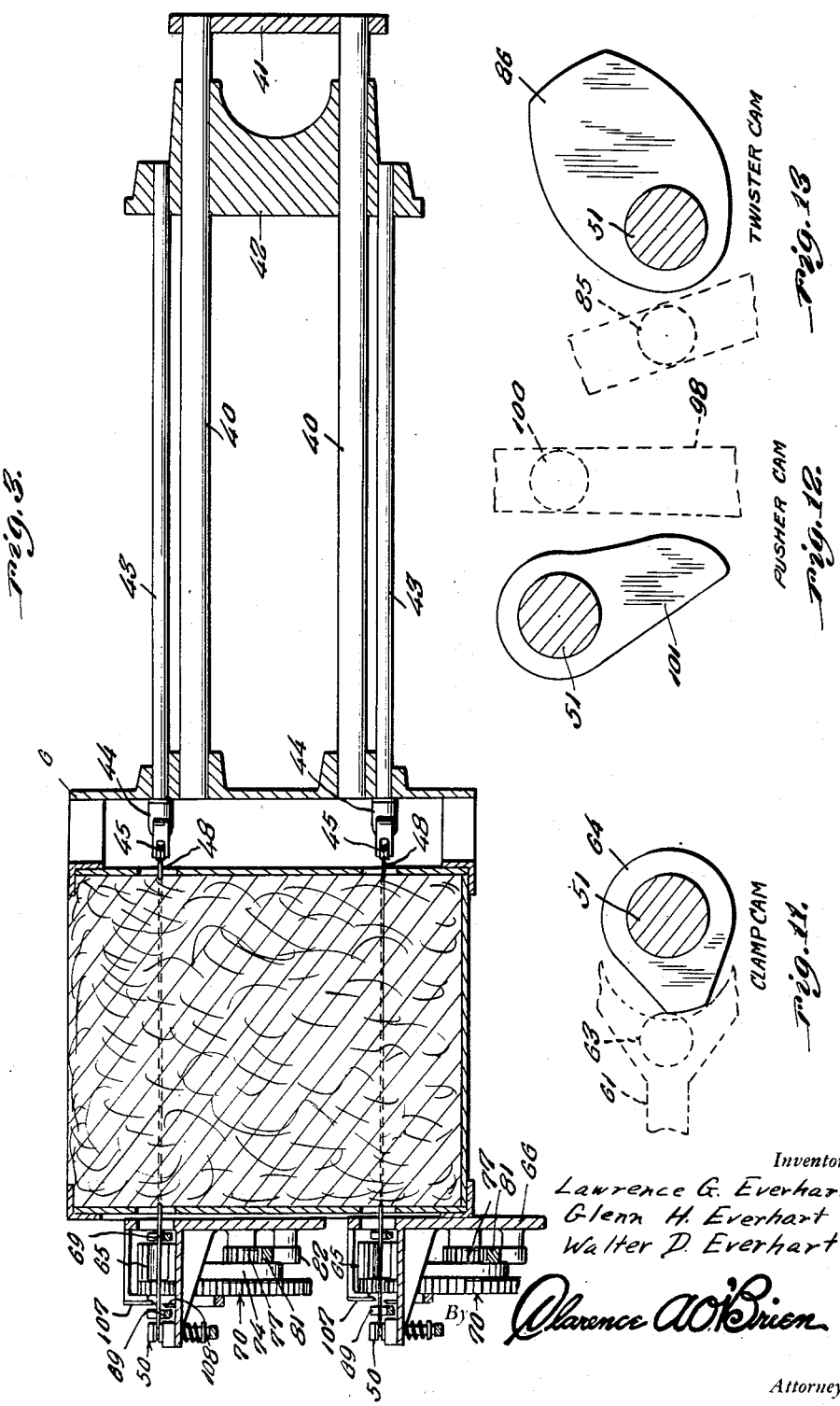

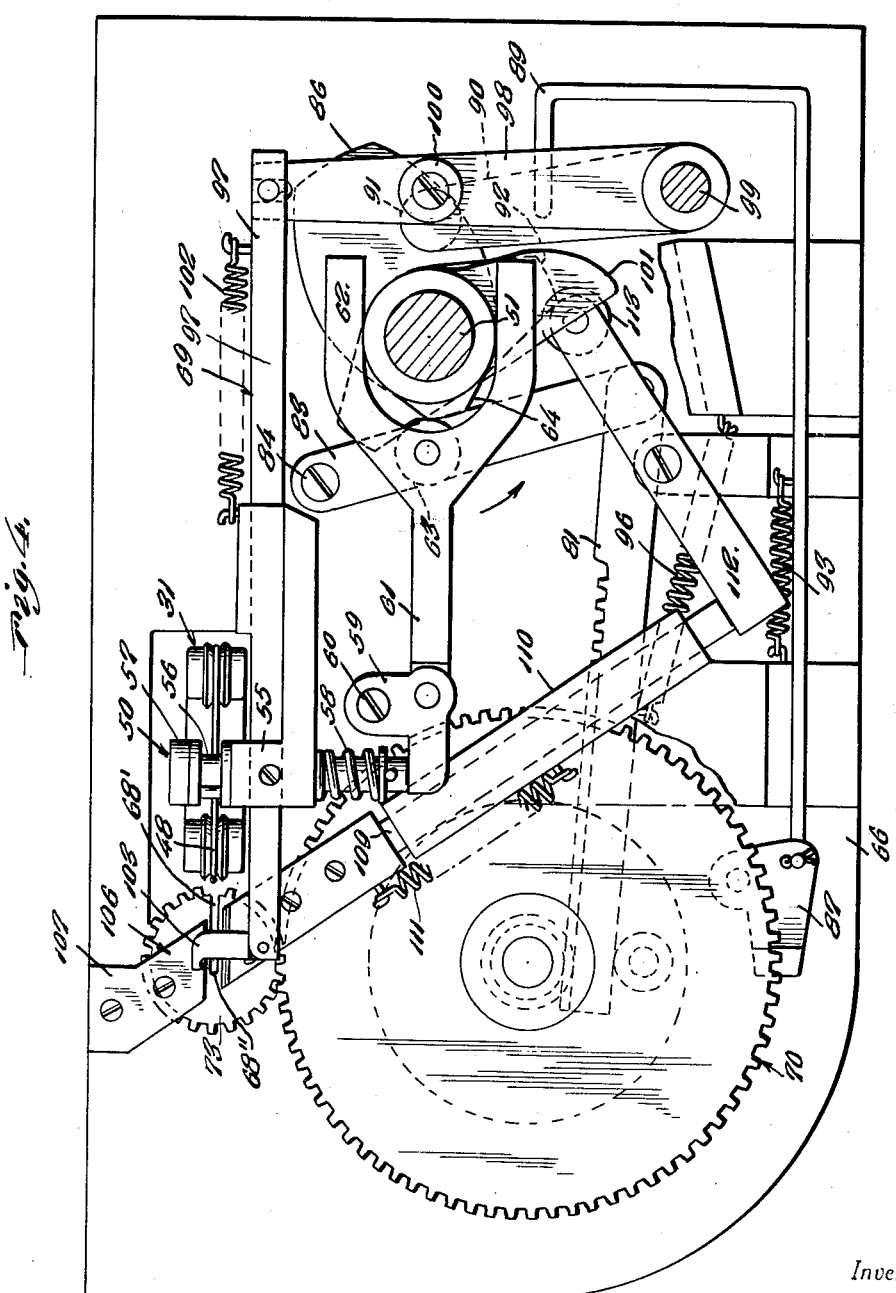

March 24, 1942.  L. G. EVERHART ET AL  2,277,394
WIRE TYING DEVICE FOR HAY BALERS
Filed Feb. 25, 1941  8 Sheets-Sheet 5
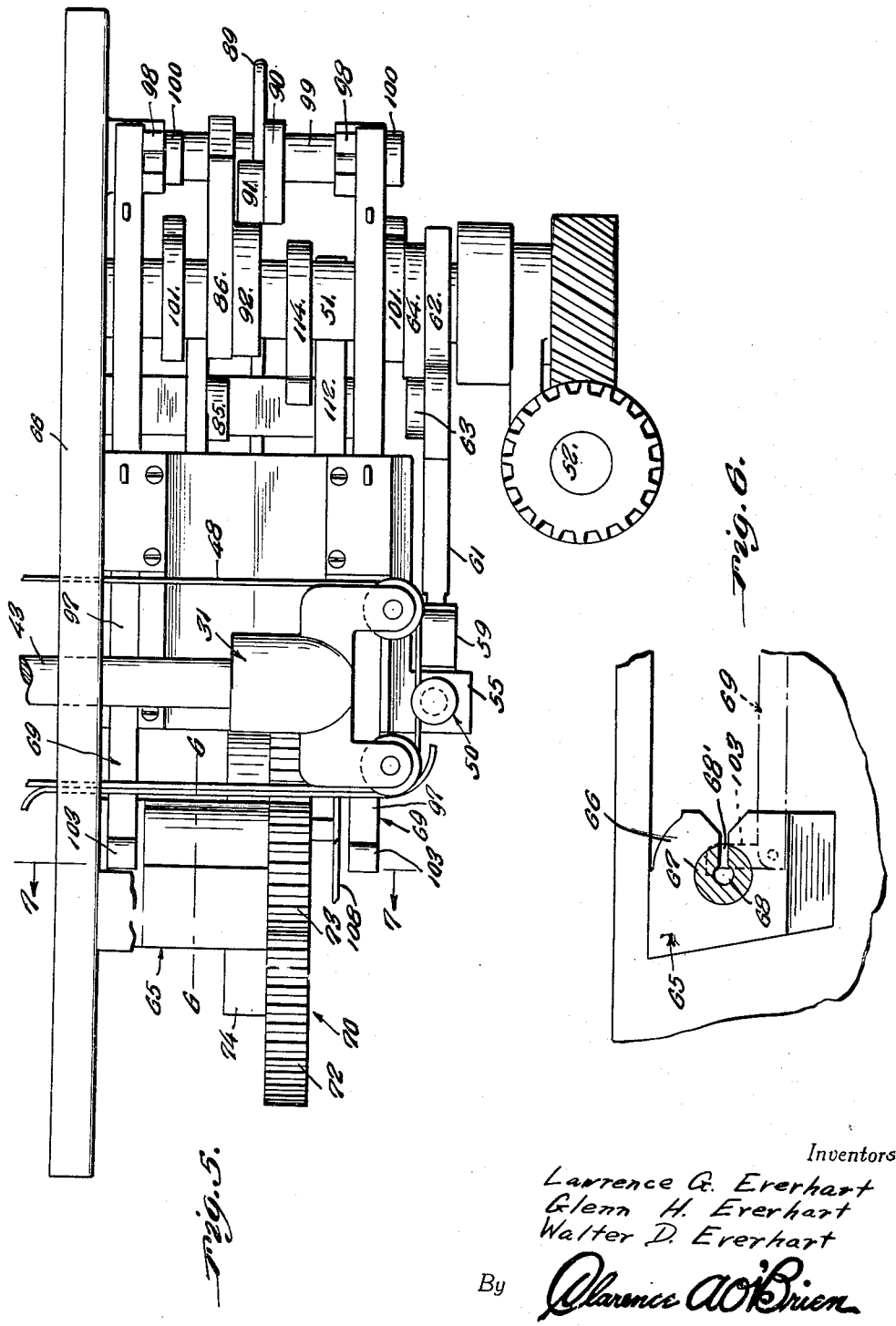
Inventors
Lawrence G. Everhart
Glenn H. Everhart
Walter D. Everhart
By Clarence A. O'Brien
Attorney March 24, 1942.  L. G. EVERHART ET AL  2,277,394
WIRE TYING DEVICE FOR HAY BALERS
Filed Feb. 25, 1941  8 Sheets-Sheet 6
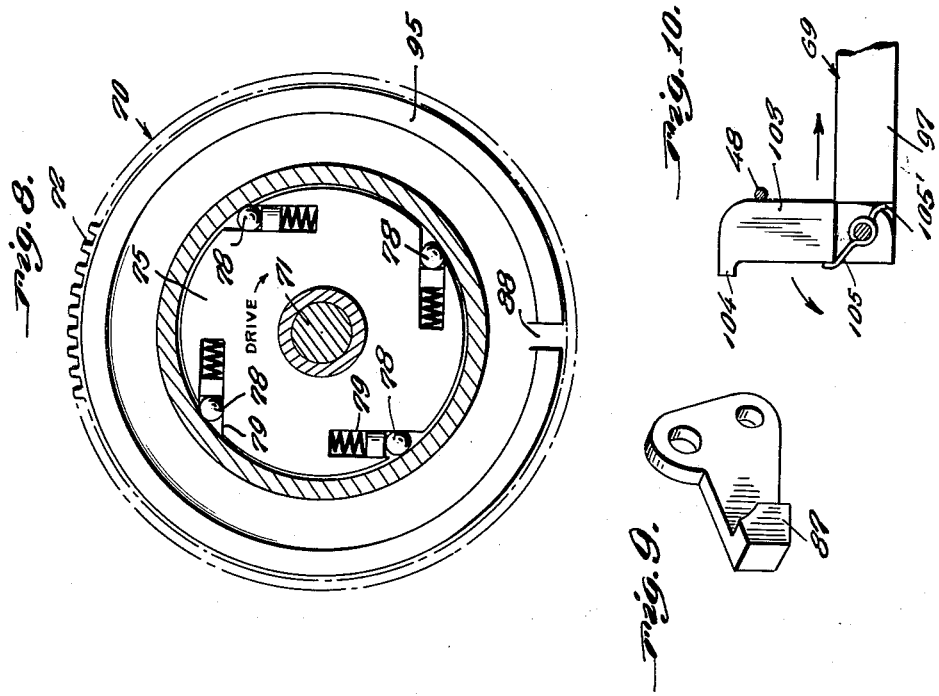
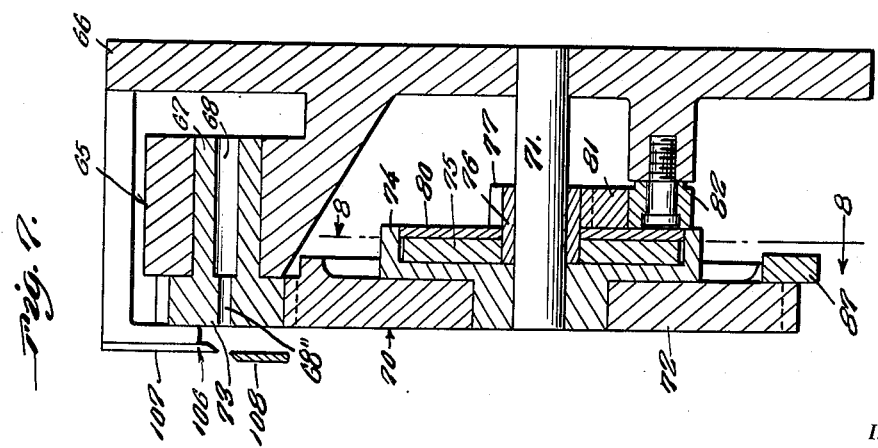
Inventors
Lawrence G. Everhart
Glenn H. Everhart
Walter D. Everhart
By Clarence A. O'Brien
Attorney

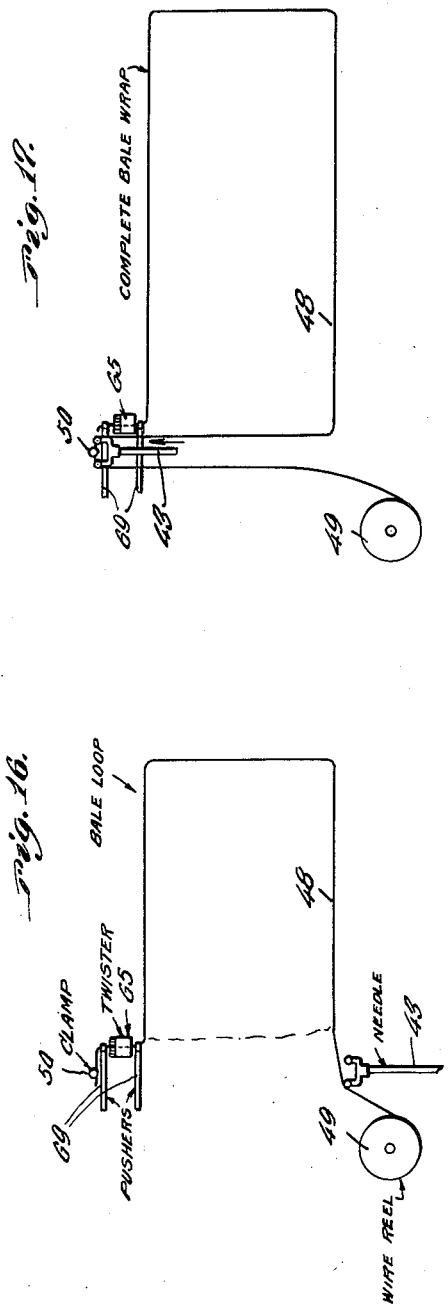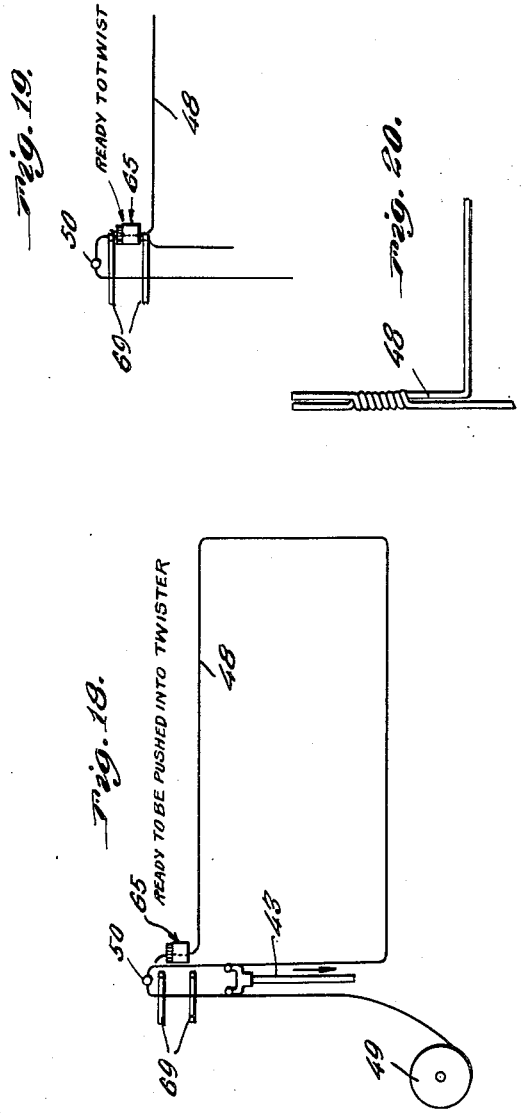

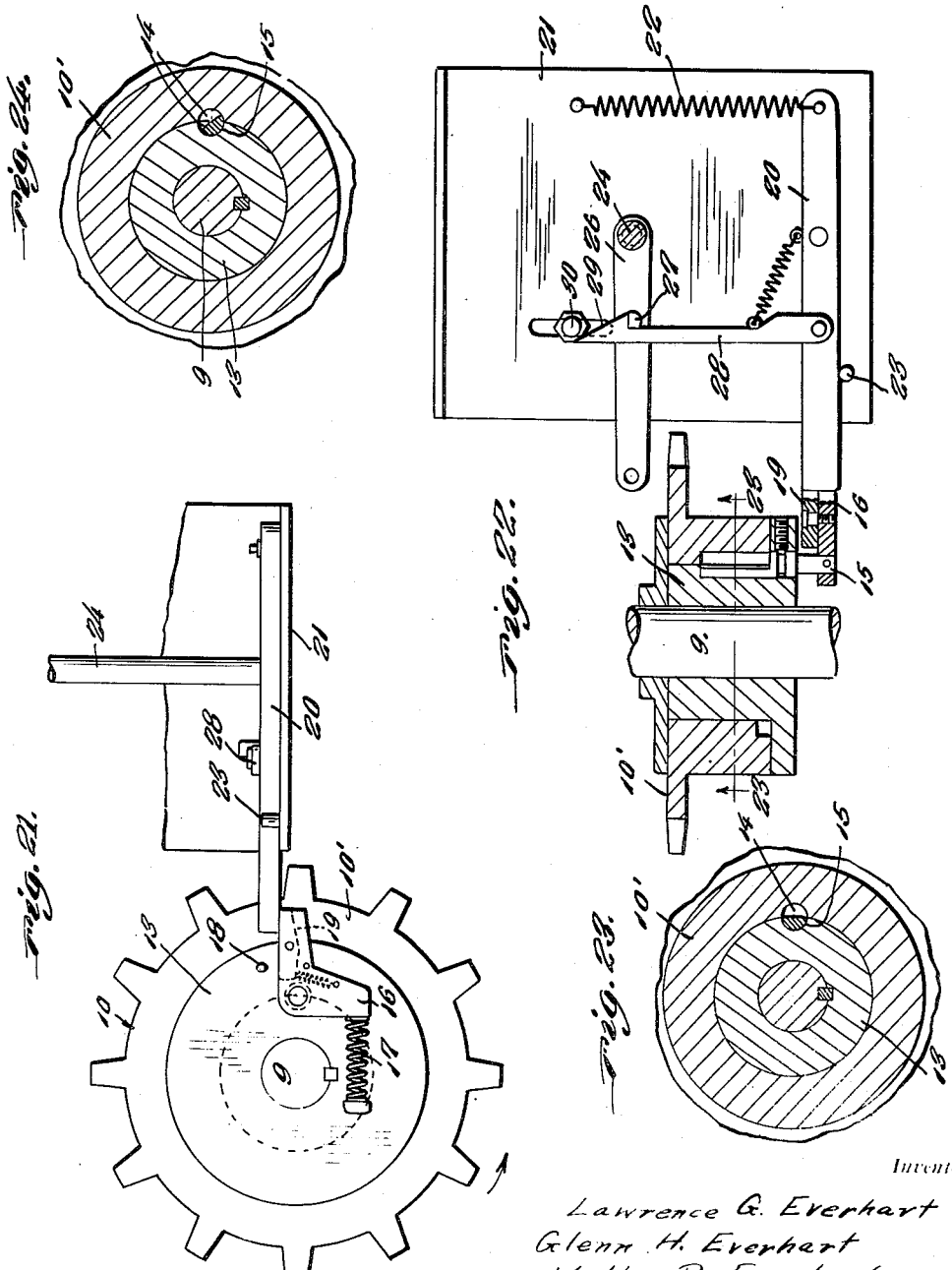

Patented Mar. 24, 1942

2,277,394

UNITED STATES PATENT OFFICE 2,277,394

WIRE TYING DEVICE FOR HAY BALERS

Lawrence G. Everhart, Glenn H. Everhart, and Walter D. Everhart, Winston-Salem, N. C.

Application February 25, 1941, Serial No. 380,538

6 Claims. (Cl. 140—73)

This invention relates to an automatic hay baler wire placing and tying device, and has for the primary object the provision of a device of this character which will reduce to a minimum hand operations in the tying of bales produced by a hay baler.

Another object of this invention is the provision of a device of the above stated character which will position tying wires in a baler and tie the wires and cut said wires from a wire supply so that on each bale of hay delivered from the baler it will be bound properly for storage or shipment.

With these and other objects in view as will become more apparent as the description proceeds, the invention consists in certain novel features of construction, combination and arrangement of parts as will be hereinafter more fully described and claimed.

For a complete understanding of our invention, reference is to be had to the following description and accompanying drawings, in which—

Figure 1 is a fragmentary side elevation illustrating a portion of a hay baler equipped with a wire tying device constructed in accordance with our invention.

Figure 2 is a fragmentary top plan view partly in section showing a portion of the hay baler with the present invention applied thereto.

Figure 3 is a fragmentary transverse sectional view illustrating the needles for the placing of the tying wires in the baler and the support for said needles.

Figure 4 is a fragmentary side elevation, partly in section illustrating the wire clamp, wire cutting means and the operating means for said parts.

Figure 5 is a fragmentary top plan view illustrating the wire clamp, portions of the needles positioning the wires in the clamp and the operating means therefor.

Figure 6 is a transverse sectional view taken on the line 6—6 of Figure 5 showing the wire twister or tying device.

Figure 7 is a sectional view taken on the line 7—7 of Figure 5 illustrating the wire twister or tying device.

Figure 8 is a sectional view taken on the line 8—8 of Figure 7 illustrating the clutch of the tying device.

Figure 9 is a perspective view illustrating a locking dog for the clutch.

Figure 10 is a fragmentary side elevation illustrating a portion of one of the pushers.

Figure 11 is a side elevation, partly in section, illustrating a clamp operating cam.

Figure 12 is a view similar to Figure 11 illustrating the pusher operating cam.

Figure 13 is a side elevation partly in section illustrating the twister operating cam.

Figure 14 is a side elevation, partly in section, illustrating a cam for the actuation of the clutch lock.

Figure 15 is a side elevation partly in section illustrating a cam for the operation of the wire cutter.

Figure 16 is a diagrammatical view showing one of the baling wires leading off of a wire supply reel and extending about the interior of a baler hopper and having its ends secured by the clamp.

Figure 17 is a diagrammatical view illustrating the complete wrapping of the wire in bale formation.

Figure 18 is a diagrammatical view illustrating the wire ready to be inserted into the twister or tying device.

Figure 19 is a diagrammatical view illustrating the wire positioned in the twister or tying device ready to be twisted.

Figure 20 is a fragmentary plan view illustrating a portion of the tie wire twisted or tied.

Figure 21 is a fragmentary side elevation illustrating a main clutch and a portion of the operating means.

Figure 22 is a fragmentary plan view partly in section illustrating the main clutch and its control.

Figure 23 is a detail sectional view taken on the line 23—23 of Figure 22.

Figure 24 is a view similar to Figure 23 illustrating the clutch engaged while Figure 23 illustrates the clutch disengaged.

Referring in detail to the drawings, the numeral 5 indicates a fragmentary portion of a hay baler, consisting primarily of the hopper 6, plunger 7 and the operating means therefor including bull gears 8 adapted to be driven in the usual manner. It is to be understood that the plunger 7 compresses the hay within the hopper into bale formation and when the hay has been compressed into bale formation the compressed hay must be secured, usually through the use of baling wires. It is the customary practice to manually place the wires about the bale and then manually tie such wires requiring a considerable amount of labor and time. To eliminate the manual labor incident to the placing and tying of the wires, the present invention is installed on the baler to automatically, under manual control, place the baling wires from a supply into the baling hopper and to tie said wires and cut the wires from the wire supply so that when the bale is removed from the baler it will be properly bound for shipment or storage.

A shaft 9 is rotatably supported on the baler 6 and extends transversely thereof. The shaft 9 is equipped with a clutch 10 including a sprocket gear 10' connected to a shaft 12 by a sprocket chain 12'. The shaft 12 is geared to one of the stub shafts of the bull gears 8. Thus it will be seen that a drive has been established from the bull gears to the shaft 9 wherein the drive may be controlled through the use of the clutch 10. The normal action of the clutch 10 is to interrupt the drive to the shaft 9 and may be manually actuated whenever it is proper to rotate the shaft 9 by the drive mechanism for the operation of the present invention on the baler.

The clutch 10 besides including the sprocket gear 10' also includes a sleeve 13 keyed on the shaft 9 and provides a journal for the sprocket gear 10' as well as one of the clutch elements of the clutch 10, the hub of the gear forming the other clutch element. The sleeve 13 and the hub of the gear are provided with matched grooves 14. The sleeve 13 is further provided with a bearing opening aligning with the groove 14 thereof.

A key 15 is journaled in the bearing opening and includes a semi-cylindrical portion operable within the groove of the sleeve 13 and movable into the groove of the hub of the gear 10' when the grooves 14 are in matched relation and the key 15 rotated, so as to establish a drive between the sprocket gear 10' and the sleeve 13. A dog 16 is secured to the key 15 and is acted upon by a coiled spring 17 tending to rotate the key in a position so that the semi-cylindrical portion thereof enters the companion grooves 14. A stop pin 18 may be provided on the sleeve 13 for limiting the movement of the dog 16 beyond a certain distance as would bring the semi-cylindrical portion of the key out of the groove of the gear 10' when said dog is freed and under the action of the spring 17. A spring influenced finger 19 is pivoted on the dog and will occupy a position angularly to said dog when freed. The finger performs the function of a stop for a latch lever 20 under certain periods or conditions of operation of the clutch 10. The latch lever 20 is pivotally mounted on a supporting plate 21 mounted on the frame of the baler and is actuated on by a spring 22 for the positioning of said lever against a stop 23 and in the path of the dog 16 so that normally when the clutch is disengaged to interrupt the drive to the shaft 9 the dog is partly overlaid by the latch lever also the finger 19 maintaining the latter in parallelism with a portion of the dog. At this time the key 15 is positioned so that the semi-cylindrical portion thereof lies only within the groove of the sleeve of the clutch, consequently the clutch may be at this time termed declutched.

When the lever 20 is pivoted through a means later described in detail, it is moved out of the path of the dog 16 as well as the finger 19, the latter assuming an angular position to prevent the lever 20 from returning into the path of the dog. The spring 17 acts on the dog, the latter being freed of the lever at this time, will rotate the key to establish the drive between the gear 10' and the sleeve, consequently clutching the clutch to drive the shaft 9 by the drive from the bull gears. When the sprocket gear or shaft 9 has made one complete revolution, the lever 20 having been disengaged from the finger 19 assumes a position in the path of the dog so that the dog will be engaged with said lever and bring about a reverse rotation of the key to interrupt the drive between the gear 10' and the hub and consequently declutch the clutch.

An operating shaft 24 is journaled on the supporting plate 21 as well as the frame of the baler and is provided with a handle 25 whereby the operator may rotate the operating shaft. An arm 26 is secured to the shaft 24 and carries a pin 27 engaged in a notch of a spring influenced dog 28 pivoted on the lever 20. The free end or notched end of the dog has a beveled face 29 riding against a cam 30 carried by the supporting plate 21.

When the operator rotates the shaft 24 in one direction it imparts an endwise movement to the dog 28 bringing about a pivotal movement of the lever 20 out of the path of the dog 16. As the dog 28 moves endwise it rides the cam 30 and is disengaged from the lug 27 so that after the shaft 9 has made one complete revolution the lever 20 may bring about declutching of the clutch 10 regardless of the fact that the operator still places pressure on the handle 25, it being understood that this arrangement is merely a safety factor to assure the lever 20 assuming a position of declutching the clutch after one complete revolution of the shaft 9 should the operator fail to release the handle 25 immediately after the handle has been operated into a position of bringing about clutching of the clutch.

A reciprocal type needle mechanism is indicated in entirety by the character 31 and is located upon one side of the baler hopper and is actuated by the rotation of the shaft 9. A cam 32 is secured to one end of the shaft 9 and riding the cam is an arm 33 formed on a sleeve 34 journaled upon a support 35 mounted on the baler. The sleeve 34 has an arm 36 connected to a bell crank lever 37 by linkage 38. The bell crank lever 37 is pivotally mounted on a support 39 mounted on the baler. The bell crank lever 37 operates the needle mechanism 31.

The needle mechanism 31 includes parallel spaced guide members 40 extending from one side of the baler hopper and have their free ends tied together, as shown at 41. A head 42 is slidably mounted on the guide members and carries needles 43 having forked ends 44 provided with grooved rollers 45. The head 42 is connected to the bell crank lever 37 by linkage 46.

Coil springs 47 are connected to the head 42 for normally positioning the roller carrying ends of the needles outside of the hopper 6, the latter being provided with openings to permit the needles when driven to pass into the hopper and extend transversely thereof for the purpose of carrying into the hopper tying wires 48 fed off of reels 49 rotatably mounted on the side of the hopper.

It is to be understood that the purpose of the needles is to carry the baling or tying wires through the hopper to clamps 50 located on the opposite side of the hopper from the support for the needles. The action of the springs 47 is to retract the needles and to keep the arm 33 riding the cam 32.

It is to be understood that when the needles 43 are actuated transversely of the hopper of the baler they carry the tie wires across the baler into the clamps 50. The clamps 50 are of duplicate construction which also applies to the operating means therefor. Therefore, in the following only one of the clamps will be described specifically as well as its operating means.

A cam shaft 51 is rotatably supported on the side of the hopper and is geared to a shaft 52 which is in turn geared to a shaft 53. The shaft 53 is rotatably supported in hangers 54 carried by the baler. The shaft 53 is geared to the shaft 9. The cam shaft 51 has secured thereto a series of cams for the operation of the clamps 50, wire cutting devices and wire tying devices, all of which will be described in detail in the further description of the invention.

The clamp 50 includes a base member 55 suitably mounted on the baler and a plunger 56 slidable therein and having a head 57 coactive with the base 55 in gripping the wires. The plunger is urged into wire gripping position by a coil spring 58. The plunger 58 is engaged by a bell crank lever 59 pivotally mounted, as shown at 60, and to which is pivoted an operating rod 61 having a forked end 62 to straddle the shaft 51 and slide thereon.

The operating rod 61 carries a roller 63 which rides upon a clamp operating cam 64 secured on the cam shaft 51. The cam acts to move the clamp into clamping and unclamping position.

Wire twisting or tying devices 65 are located in close proximity to the clamps 50 and as each are of the same construction as well as the drive means therefor, only one will be described in detail.

The wire twisting or tying device consists of a slotted mounting 66 suitably secured on the baler and has journaled therein a twisting element 67 provided with a bore which extends from end to end of the twisting member 67 and the bore opens outwardly through a side of said twisting member in the form of a slot 68' to align with the slotted portion of the mounting 66 so that portions of the tying wire may be shoved therein by pushers 69 operating at each end of the twisting member 67. As shown in Figures 4, 6 and 7 the bore includes a cylindrical long part 68 and a short front part made in the form of a slot 68" which forms a continuation of slot 68'.

In order to rotate the twisting member 67 a drive is provided therefor which includes a clutch 70 supported on a stub shaft 71 carried by the mounting 66 for the twisting member. The clutch 70 is in the form of a gear 72 meshing with a pinion 73 formed on the front end of the twisting member 67 and which pinion contains the slots 68'—68".

At this time it may be stated that the clutch 70 is of the overrunning type, as shown in Figure 8. The hub of the gear 72 has integral therewith a drum 74. A clutch disc 75 operates within the drum 74 and is secured on a hub 76 of a gear 77 journaled on the shaft 71. The clutch disc 75 carries spring pressed balls 78 to engage the drum 74 and establish a driving connection between the gear 26 and the gear 72 when the clutch is rotating in one direction and to permit the gear 72 to idle when the clutch is rotating in a reverse direction or the clutch disc 75 thereof. The balls 78 are mounted in pockets 79 formed in the clutch disc 75. A dust plate 80 is provided for closing the drum 74 and is supported by the hub of the gear 77. The gear 77 is in mesh with a rack bar 81, a roller 82 carried by the mounting 66 slidably supports the rack bar in mesh with said gear 77. A lever 83 is pivotally mounted, as shown at 84, and is pivotally connected to the rack bar and carries a roller 85 which rides the cam 86 on the cam shaft 51.

A pivotally mounted latch dog 87 is employed for releasably securing the gear 72 of the clutch 70 against rotation by engaging in a notch 88 provided in the gear 72. An operating rod 89 is pivotally connected to the latch dog 87 and to a pivotally mounted lever 90 carrying a roller 91 which rides upon a cam 92 secured to the cam shaft 51 for disengaging the latch dog 87 from the notch 88 of the gear 72 of the clutch. The rod 89 is spring influenced by a spring 93 to maintain the roller 91 in engagement with the cam 92.

When the tying device is to be operated to twist or tie a wire after the portions thereof have been positioned in the twisting member 67 by the pushers 69, the cam 92 disengages the latch 87 from the notch 88 and the cam 86 operates the rack bar 81 to drive the gear 72 of the clutch 70 in one direction. The rotation of the gear 72 as stated rotates the twister 67 several times to one rotation of the gear 72 to bring about twisting of the portions of wire together, as shown in Figure 20.

The cam 92 is of the quick operating type, that is, it immediately frees the latch dog 87 after it has been once disengaged from the notch 88 so that the dog rides upon an annular face 95 on the gear 72 until the gear 72 has made one complete revolution and the dog 87 under the influence of the spring 93 then moves into the notch 88 stopping the rotation of the gear 72. The one complete rotation of the gear 72 is sufficient to rotate the twisting member several times and in order that the slot 68' of the twisting member be opposite the groove in the mounting 66 to permit the twisted wire to pass therefrom, the latch 87 enters the notch 88 stopping further rotation of the gear 72 and properly positioning the twisting member to permit the wires to pass therefrom and also to enter said twisting member.

The movement of the rack bar 81 in one direction is sufficient to rotate the gear 72 one complete revolution. During the reverse movement of the rack bar 81 the overrunning clutch described permits the gear 77 thereof to rotate in a reverse direction while the gear 72 remains idle. Thus it will be seen that the roller of the lever 83 rides the cam 92 continuously and brings about the reciprocation of the rack bar 81.

Springs 96 act on the rack bar 81 for the purpose of maintaining the roller 85 in engagement with the cam 86 at all times.

The pushers 69 include slidably supported rods 97 pivotally connected to operating levers 98 pivotally supported, as shown at 99, and the levers 98 carry rollers 100 which ride cams 101 secured on the cam shaft 51. Springs 102 act upon the rods 97 to keep the rollers 100 in riding contact with the cams 101. The rods 97 have pivoted thereto spring influenced fingers 103 provided with hook shaped ends 104. The fingers 103 are provided with shoulders 105 which normally engage the rods 97 under the influence of the springs 105' of said fingers so that the fingers will be positioned at right angles to the rods. When the fingers or the shoulders thereof are in engagement with the rods said rods sliding in a given direction will carry the wires into the twisting members of the tying devices. However, it is to be seen that in order for the fingers to engage said wires for shoving them into the tying devices the fingers must swing in the direction of the arrow indicated to the left in Figure 10 so that the fingers will ride under the wires and permit the hook-shaped ends to engage therewith so that on movement of the rods 97 of the pushers in a reverse direction the wires will be carried into the tying devices. A very clear illustration of the fingers and the direction of movement of said fingers is indicated by arrows in Figure 10.

Cutters 106 are provided for severing the wires after being tied by the tying devices and as each is similarly constructed as well as the operating means therefor, only one of the cutters will be described in detail. The cutter consists of a fixed knife 107 located on the mounting 66 and a movable blade 108 secured to a plunger 109. The plunger 109 is slidably mounted in a fixed sleeve 110 and is spring influenced by a spring 111 to normally occupy a non-cutting position. However, the plunger 109 may be slid to bring the blade 108 into cutting relation with the blade 107. The plunger 109 is engaged by a pivotally mounted lever 112 which carries a roller 113 that rides a cam 114 secured on the cam shaft 51. After the wires have been tied by the tying device the cam 114 operates the plunger and brings about severance of the wires by the blade 108 moving into cutting relation with the fixed blade 107.

From the foregoing description it will be seen that the needles and the means of operating said needles have been specifically described, also the wire clamping devices have been described in detail as well as the means of moving the wires into the tying devices and further have described in detail the cutters for the wires and the operating means therefor. It is to be understood that all of these devices complete their respective operations on one complete revolution of the cam shaft 9 and that the latter is driven one complete revolution from the drive of the hay press by the manually actuated master clutch mechanism 18.

In first starting up the press the wires are pulled across the same and fastened in the clamps 15, as shown in dotted lines in Figure 16. The press is then started and as the hay is being pushed into the press by the ram the wires are forced into the press with one portion of each wire extending across the front end of the bale and the other portions along the sides thereof, as the bale is being formed, it being understood that the wires are simply pulled from the reels 49 during the formation of the bale. Then when the bale is of suitable size the operator manipulates the handle 25 of shaft 24 so as to start the tying operation. Before this is done, however, the feeding of the hay into the press is stopped and the ram permitted to make several strokes so as to clear the hopper of loose hay so that the hopper is empty and the needles can readily pass through the same in rear of the bale. As will be seen from Figures 17 and 18, the needles carry the wires across the hopper in the form of elongated loops, one limb of the loop forming the fourth side of the wrap for the formed bale and the other limb of the loop forming the first wire for the next bale. Then an instant before the needle pushes the loop into the clamp the clamp opens and drops the first wire or that wire leading from the side of the completed bale. This allows the loop to enter the clamp and be held and the grooved roller on the needle next to the end of the bale will position its side of the loop along said first wire so that this first wire is caught in the groove in the roller. The roller next to the bale will push the end of the wire passing from the bale out of the clamp, as the clamp opens, thus leaving the clamp empty to receive the loop. The pushers now operate to push the one wire leading from the bale and the forward wire of the looped wire into the twisting means, leaving the rearward wire or the second limb of the wire loop in the clamp to form the first wire for the next bale. The needles after depositing the loops of wires in the clamps are moved out of the baler to their starting point.

The wire extending across the rear end of the bale and the end of the wire passing from the side of the bale are placed side by side in the cylindrical part 68 and the slot-like part 68" of the twisting member and then this member is rotated so that the two portions of the wire held in the slot 68" are turned while being held in side by side relation and this causes a twisting together of those portions of the wire in the cylindrical part 68 of the bore of the twisting member so that the two parts of the wire are twisted together, as shown in Figure 20. After the wires are twisted together the cutting means come into action which cuts the wire between the twister and the clamp leaving the outer limb of the loop with its end in the clamp so that this limb of the wire will be engaged by the new bale. This new bale being formed will push the first bale out of the baler and this will pull the twisted part of the wire out of the twister. Upon completion of the cutting action all parts return to their original or starting position.

Figure 16 shows in dotted lines how the wire could be placed in position across the press by hand at the initial starting of the press.

Figure 17 is a diagrammatic view showing the position of the parts after the bale has been formed and a needle moved forwardly to place the bight of the loop in the clamp 50. Figure 18 is a view showing the needle moving back to the starting point and the plunger ready to push the wire into the twister. Figure 19 is a view showing the parts in position ready to twist the wire.

It will be seen that the operator can at any time set the present invention in operation for tying the bale. This will give the operator complete control over the size of the bale formed and tied in the baler and by the present invention.

While we have shown and described the preferred embodiment of our invention, it will be understood that minor changes in construction, combination and arrangement of parts may be made without departing from the spirit and scope of the invention as claimed.

Having thus described the invention, what we claim is:

1. In a wire tying device for hay balers, a mounting having a slot in one edge, a twisting member journaled in said mounting at the inner end of the slot and having a bore of different diameters opening outwardly through one side thereof to register with the slot to receive wires, and a drive mechanism for the twisting member and including an overrunning clutch and latch mechanism for rotating the twisting member a predetermined number of revolutions and stopping said twisting member with the slot of the bore in registration with the slot of the mounting.

2. In a wire tying device, a mounting having a slot, a twisting member journaled in said mounting and having a bore of different diameters opening outwardly through one side thereof to register with the slot to receive wires, and a drive mechanism for the twisting member and including an overrunning clutch and latch mechanism for rotating the twisting member a predetermined number of revolutions and stopping said twisting member with the slot of the bore in registration with the slot of the mounting, and a drive mechanism for said clutch and including a spring influenced rack bar operated by the rotation of a power driven cam.

3. In a wire tying device, a mounting having a slot, a twisting member journaled in said mounting and having a bore opening outwardly through a side thereof to align with the slot to receive wires and having the bore of different diameters, a gear secured to said twisting member, an overrunning clutch including a gear meshing with said first-named gear and a drum secured to said second-named gear and forming a journal therefor and a clutch disc having spring influenced balls to engage the drum and a drive pinion secured to the disc, and an operating means for rotating the last-named gear.

4. In a wire tying device, a mounting having a slot, a twisting member journaled in said mounting and having a bore opening outwardly through a side thereof to align with the slot to receive wires and having the bore of different diameters, a gear secured to said twisting member, an overrunning clutch including a gear meshing with said first-named gear and a drum secured to said second-named gear and forming a journal therefor and a clutch disc having spring influenced balls to engage the drum and a drive pinion secured to the disc, and a rack bar for imparting rotation to the last-named gear in opposite directions, and a power driven cam mechanism for actuating the rack bar.

5. In a wire tying device, a supporting member having a longitudinally extending elongated slot therein, a member rotatably arranged in the supporting member and having a bore passing therethrough and a slot extending from end to end therein and connecting the bore with the slot of the supporting member when the rotary member is in a certain position, one end of the bore being slit and forming a continuation of the slot in the rotary member, the rest of the bore being of cylindrical shape in cross section and of greater cross sectional area than the slotted part of the bore, the slotted part of the bore receiving parts of a wire to be tied together with other parts extended into the cylindrical portion, and means for rotating the rotary member which causes rotary movement of the two parts in the slotted part of the bore and twists together the parts in the cylindrical portion of the bore.

6. In a wire tying device, a mounting having a slot in one edge, a twisting member journaled in said mounting at the inner end of the slot and having a bore of different diameters opening outwardly through one side thereof to register with the slot to receive wires, and a drive mechanism for the twisting member and including means adapted for rotating the twisting member a predetermined number of revolutions and stopping said twisting member with the slot of the bore in registration with the slot of the mounting.

LAWRENCE G. EVERHART.
GLENN H. EVERHART.
WALTER D. EVERHART.